(12) United States Patent
Farran et al.

(10) Patent No.: US 10,514,625 B2
(45) Date of Patent: Dec. 24, 2019

(54) ELECTROPHOTOGRAPHIC INK INCLUDING A VOLATILE FRAGRANCE

(71) Applicant: HP Indigo B.V., Amstelveen (NL)

(72) Inventors: Samer Farran, Nes Ziona (IL); Guy Nesher, Nes Ziona (IL); Yaron Grinwald, Nes Ziona (IL); Shahar Stein, Nes Ziona (IL); Shiran Zabar, Nes Ziona (IL); Tony Azzam, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/073,436

(22) PCT Filed: Mar. 9, 2016

(86) PCT No.: PCT/EP2016/054974
§ 371 (c)(1),
(2) Date: Jul. 27, 2018

(87) PCT Pub. No.: WO2017/152964
PCT Pub. Date: Sep. 14, 2017

(65) Prior Publication Data
US 2019/0041765 A1    Feb. 7, 2019

(51) Int. Cl.
| | | |
|---|---|---|
| *G03G 9/135* | (2006.01) | |
| *G03G 9/12* | (2006.01) | |
| *G03G 9/125* | (2006.01) | |
| *G03G 9/08* | (2006.01) | |
| *C09D 11/52* | (2014.01) | |
| *C09D 11/03* | (2014.01) | |
| *G03G 9/13* | (2006.01) | |

(52) U.S. Cl.
CPC ............ *G03G 9/135* (2013.01); *C09D 11/03* (2013.01); *C09D 11/52* (2013.01); *G03G 9/0804* (2013.01); *G03G 9/122* (2013.01); *G03G 9/125* (2013.01); *G03G 9/13* (2013.01)

(58) Field of Classification Search
CPC .......... G03G 9/135; G03G 9/13; G03G 9/125; G03G 9/122; G03G 9/0804; C09D 11/03; C09D 11/52
See application file for complete search history.

(56) References Cited

U.S. PATENT DOCUMENTS

| | | |
|---|---|---|
| 3,685,734 A | 8/1972 | Paciorek et al. |
| 5,324,444 A | 6/1994 | Berry et al. |
| 8,541,153 B2 | 9/2013 | Matsumura et al. |
| 2008/0305027 A1 | 12/2008 | Johnston et al. |
| 2013/0288175 A1* | 10/2013 | Chun ............... G03G 13/10 430/112 |
| 2014/0023690 A1 | 1/2014 | Fosco et al. |
| 2015/0376546 A1 | 12/2015 | Diaz Gomez et al. |
| 2018/0143558 A1* | 5/2018 | Nesher ............... G03G 9/12 |

FOREIGN PATENT DOCUMENTS

| | | |
|---|---|---|
| CN | 101121835 | 2/2008 |
| EP | 1416023 | 5/2004 |
| WO | 2012082129 | 6/2012 |
| WO | 2014151760 | 9/2014 |

OTHER PUBLICATIONS

International Search Report dated Jul. 26, 2016 for PCT/EP2016/054974, Applicant Hewlett-Packard Indigo B.V.

* cited by examiner

*Primary Examiner* — Thorl Chea
(74) *Attorney, Agent, or Firm* — Thorpe North & Western LLP

(57) ABSTRACT

According to an example, an electrophotographic ink may include an adsorbent, a volatile fragrance, a resin and a carrier liquid.

14 Claims, No Drawings

ELECTROPHOTOGRAPHIC INK INCLUDING A VOLATILE FRAGRANCE

BACKGROUND

Ink compositions containing charged particles are used in a wide variety of applications such as toners in electrophotography printing, pigmented ink, electrophotographic displays as well as many other applications. Liquid electrophotographic printing is a specific type of electrophotographic printing where a liquid ink is employed in the process rather than a powder toner. A liquid electrophotographic ink composition is generally formed by grinding a carrier liquid, a resin, and a pigment to form an ink slurry. A charge adjuvant and a charge director may be mixed with the ink slurry after grinding. Ultimately, an electrophotographic ink is formed.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein is an electrophotographic ink, and particularly, a liquid electrophotographic ink. The liquid electrophotographic ink disclosed herein may have a resin, a carrier liquid, an adsorbent, and a volatile fragrance. The adsorbent may be mixed with the volatile fragrance and an organic solvent for a period of time. The organic solvent may then be evaporated. The adsorbent with the volatile fragrance may be added to a paste, which may be diluted to form a slurry. A charge director may be added to the slurry to form the liquid electrophotographic ink. The liquid electrophotographic ink may be used to print an image and may emit the volatile fragrance over a period of time.

The adsorbent may be any particle that may adsorb the volatile fragrance. The adsorbent may be chosen based upon parameters including, but not limited to, pore size, structure, wall thickness, and surface functionality (e.g., hydrophilic or hydrophobic (treated)). The adsorbent may have a Brunauer-Emmett-Teller (BET) surface area ranging from about 25 $m^2/g$ to about 1000 $m^2/g$, for example from about 30 $m^2/g$ to about 900 $m^2/g$, for example from about 40 $m^2/g$ to about 800 $m^2/g$ and as a further example from about 50 $m^2/g$ to about 600 $m^2/g$.

The adsorbent may have a pore size ranging from about 0.5 nm to about 80 nm, for example from about 0.7 nm to about 70 nm, for example from about 1.0 nm to about 65 nm, and as a further example from about 2 nm to about 60 nm.

The adsorbent may have a particle size ranging from about 3 nm to about 500 nm, for example from about 5 nm to about 400 nm, for example from about 10 nm to about 300 nm, and as a further example from about 15 nm to about 250 nm. In an example, the adsorbent may have a particle size from about 5 nm to about 50 nm.

The adsorbent may be a network of amorphous silica that may be randomly interconnected thereby having a large surface area. An adsorbent with a high surface area may be able to adsorb compatible materials, such as a volatile fragrance, at a higher concentration.

Non-limiting examples of adsorbents include inorganics such as platy minerals and polymers. Examples of inorganics include, but are not limited to, fumed and other forms of silicon including precipitated silicon and vapor deposited silicon; aerosols; aerogels; silica gels: clay; kaolin; perlite; bentonite; talc; mica; calcium carbonate; titanium dioxide; zinc oxide; iron oxide; silicon dioxide; and the like. Mixtures of different adsorbents may also be utilized.

The adsorbent may be fumed silica or may be any silica powder with a broad range of surface area and particle size. The aggregate size of the fumed silica may range from about 50 to about 1000 nm in size, for example from about 100 to about 500 nm in size. The Brunauer-Emmett-Teller (BET) surface area of the fumed silica may range from about 100 to about 500 $m^2/g$, and for example from about 150 to about 300 $m^2/g$. The adsorbent may be AEROSIL 300 available from Evonik.

The volatile fragrance may be those which, for example, have been disclosed as perfumes, and their parent substances or food aromas, for example coffee aroma, etc. The fragrance materials used may be natural or synthetic substances.

Non-limiting examples of a synthetic volatile fragrance which may be used are:

1) Vanillin fragrances, for example, vanillin, anisaldehyde, isovanillin, 4-nitroguaiacol or heliotropin, 2) Fragrances that may be derived from benzylacetone, for example, raspberry ketones, zingerone, benzyl acetate, 1-(p-hydroxyphenyl)-3-butenone or 1-(m-hydroxyphenyl)-3-butanone, 3) Fragrances of the valencan series, for example, nootkatone (fragrance: grapefruit-like), isonootkatone (fragrance: woody), 1,10-dihydronootkatone (fragrance: fruity) or α-vetivone (fragrance: floral, waxy, woody), 4) Fragrances and flavorings having a roast aroma, for example, 2,5-dimethyl-4-hydroxy-3(2H)-furanone (fragrance: pineapple and strawberry aroma), 2-hydroxy-3,5-dimethyl-2-cyclopentene-1-one, maltol or 3-hydroxy-3-methyl-2-cyclohexen-1-one, 5) Bread aromas, for example, isomaltol or 2,5-dimethyl-3(2H)-furanone, 6) Fragrances having a floral and green character, for example, jasmone, methyl (−)-jasmonate, (−)-jasmalacetone or 3-cis-hexanol, 4-cis-heptenal, 5-cis-octen-2-one or 2-trans-6-cis-monadienal, 7) Fragrances of the α-ionone series, for example, trans-α-ionone (fragrance: violets), trans-α-damascone or cis-α-ionone (fragrance: cedarwood) or cis-α-damascone, 8) Fragrances of the undecanone series, for example, 6-undecanone (fragrance: fruity), 4-undecanone (fruity, rutaceous) or 2-undecanone (rutaceous), and 9) Fragrances of ambergris (fragrance types: tobacco, sandalwood type).

Non-limiting examples of a natural volatile fragrance suitable for use herein include lavender, orange, rose, lilac, narcissus, clove, lime or jasmine blossom, or essential oils, for example aniseed, valerian, birch, cedar, lemon, clementine, cypress, eucalyptus, pine, geranium, ginger, chamomile, peppermint, rosemary, sandalwood, celery, juniper, orange peel, wormwood or cinnamon oil.

The adsorbent and the volatile fragrance may be combined with an organic solvent for a period of time. Non-limiting examples of an organic solvent suitable for use herein include $C_1$-$C_4$ alkanols such as methanol, ethanol, n-propanol, isopropanol, n-butanol, sec-butanol, tert-butanol, isobutanol; amides such as formamide and dimethylacetamide; ketones or ketone alcohols such as acetone and diacetone alcohol; ethers such as tetrahydrofuran and dioxane; nitrogen-containing heterocyclic ketones such as 2-pyrrolidone, N-methyl-pyrrolid-2-one and 1,3-dimethylimidazolid-2-one; polyalkylene glycols such as polyethylene glycol and polypropylene glycol; alkylene glycols and thioglycols containing $C_2$-$C_6$ alkylene groups such as ethylene glycol, propylene glycol, butylene glycol, triethylene glycol; thiodiglycol, hexylene glycol, and diethylene glycol; other polyols such as glycerol and 1,2,6-hexanetriol; and lower alkyl ethers of polyhydric alcohols such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol, and 22-(2-ethoxyethoxy) ethoxy]ethanol.

The adsorbent, volatile fragrance, and organic solvent may be mixed at a ratio ranging from about 1 g:5-20 g:5-20 g.

The adsorbent, volatile fragrance, and organic solvent may be mixed in a container for a period of time, such as ranging from about 15 to about 48 hours, for example, from about 20 to about 36 hours, and as a further example about 24 hours. After a period of time, the organic solvent may be evaporated, for example, using a rotary evaporation apparatus until about 100 wt. % of the organic solvent has been evaporated resulting in fragrant adsorbent particles. In an example, trace amounts of the organic solvent may be present on the fragrant adsorbent particles. In another example, less than about 3%, for example less than about 2%, and as a further example less than about 1% of the original amount of the organic solvent may be present on the fragrant adsorbent particles after evaporation. The evaporation of the organic solvent may occur over a period of time ranging about 20 minutes to about 3 hours, for example, from about 30 minutes to about 2 hours, and as a further example, for about 1 hour.

The fragrant adsorbent particles may be mixed with a paste and a charge director to form a liquid electrophotographic ink. The fragrant adsorbent particles may constitute about 2% to about 20% by weight of solids, for example from about 3% to about 15%, and as a further example from about 5% to about 13%. The paste may be formed with a carrier liquid, a resin, and a pigment.

Generally, a carrier liquid may act as a dispersing medium for the other components in the liquid electrophotographic ink. The carrier liquid may have or be a hydrocarbon, silicone oil, vegetable oil, etc. The carrier liquid may include, but is not limited to, an insulating, non-polar, non-aqueous liquid that may be used as a medium for articles. In an aspect, the carrier liquid may be a low dielectric (<2 dielectric constant) solvent.

The carrier liquid may include, but is not limited to, hydrocarbons. The hydrocarbon may include, but is not limited to, an aliphatic hydrocarbon, an isomerized aliphatic hydrocarbon, branched chain aliphatic hydrocarbons, aromatic hydrocarbons, and combinations thereof. Non-limiting examples of a carrier liquid may include aliphatic hydrocarbons, isoparaffinic compounds, paraffinic compounds, dearomatized hydrocarbon compounds, and the like. In particular, the carrier liquid may be chosen from Isopar-G™, Isopar-H™, Isopar-L™, Isopar-M™, Isopar-K™, Isopar-V™, Norpar 12™, Norpar 13™, Norpar 15™, Exxol D40™ Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid may be present in the liquid electrophotographic ink composition in an amount ranging from about 20% to about 99.5% by weight of the electrophotographic ink composition, and in some examples about 50% to about 90% by weight of the electrophotographic ink composition. In another example, the carrier liquid may be present in an amount ranging from about 60% to about 80% by weight of the electrophotographic ink composition.

The resin used in the liquid electrophotographic ink composition may include a polymer. The resin may include, but is not limited to, a thermoplastic polymer. The polymer of the resin may be selected from ethylene acrylic acid copolymers; methacrylic acid copolymers; ethylene vinyl acetate copolymers; copolymers of ethylene (e.g., 80 wt. % to 99.9 wt. %), and alkyl (e.g., $C_1$ to $C_5$) ester of methacrylic or acrylic acid (e.g., 0.1 wt. % to 20 wt. %); copolymers of ethylene (e.g., 80 wt. % to 99.9 wt. %), acrylic or methacrylic acid (e.g., 0.1 wt. % to 20.0 wt. %) and alkyl (e.g. $C_1$ to $C_5$) ester of methacrylic or acrylic acid (e.g., 0.1 wt. % to 20 wt. %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is in some examples from about 1 to about 20 carbon atoms, such as methyl methacrylate (e.g., 50 wt. % to 90 wt. %)/methacrylic acid (e.g., 0 wt. % to 20 wt. %)/ethylhexylacrylate (e.g., 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may constitute about 5% to about 90%, in some examples about 5% to about 80%, by weight of the solids of the liquid electrophotographic ink composition. Additionally, the resin may constitute about 10% to about 60% by weight of the solids of the liquid electrophotographic ink composition. Moreover, the resin may constitute about 15% to about 40% by weight of the solids of the liquid electrophotographic ink composition.

Non-limiting examples of the resin include the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin may encapsulate the pigment during mixing to create an ink particle. The ink particle may have a final particle size ranging from about 1 micron to about 10 microns. The resin encapsulated pigments may be formulated to provide a specific melting point. In one example, the melting point may be from about 30° C. to about 150° C., and for example, from about 50° C. to about 100° C. Such melting points may allow for desired film formation during printing.

The liquid electrophotographic ink composition may include a pigment. Non-limiting examples of pigments include cyan pigments, magenta pigments, yellow pigments, white pigments, black pigments, phosphorescent pigments, electroluminescent pigments, photoluminescent pigments, and combinations thereof. According to an example, the pigment may be a phosphorescent pigment having strontium oxide aluminate phosphor particles. The phosphorescent pigment may be chosen from LUMINOVA® BGL-300FF (blue-green emitting), LUMINOVA® GLL-300FF (green emitting), and LUMINOVA® V-300M (violet emitting), GBU (yellowish green emitting), all of which are available from United Mineral and Chemical Corporation; UltraGreen V10(PDPG) (green emitting) available from Glow Inc.; and LUPL34/2 (turquoise emitting), LUPL24/2 (green emitting), LUPL09 (orange emitting), all of which are available from Luminochem from Hungary, Budapest.

The pigment may be a phthalocyanine, azo, or biological chromophore. Additionally, the pigment may include inorganic pigments. The pigment may include metal, metal salts, metal compounds such as metal oxides, and coordinate complexes including their hydrates. Additionally, in an example, the pigment may include aryl groups. In another example, the pigment may include olefinic groups and/or systems.

The pigment may be a copper (II) phthalocyanine pigment. In an example, the pigment may be selected from CI Pigment Blue 15, CI Pigment Blue 15:1, CI Pigment Blue 15:2, CI Pigment Blue 15:3, CI Pigment Blue 15:4, CI Pigment Blue 15:6, CI Pigment Blue 16; CI Pigment Green 7, and CI Pigment Green 36.

The pigment may be present in the liquid electrophotographic ink from about 0.01 wt. % to about 60 wt. % of solids. In still another example, the pigment may be present from about 0.1 wt. % to about 40 wt. %, for example from about 10 to about 30 wt. %, for example from about 10 to about 20 wt. %, and as a further example from about 20 to about 30 wt. %, of the solids of the electrophotographic ink composition.

A charge director imparts a charge to the liquid electrophotographic ink, which may be identical to the charge of a photoconductive surface. The electrophotographic ink composition may include a charge director having a sulfosuccinate salt of the general formula MAn, in which M is a metal, n is the valence of M, and A is an ion of the general formula (I):

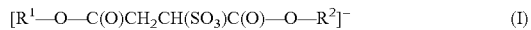

[R$^1$—O—C(O)CH$_2$CH(SO$_3$)C(O)—O—R$^2$]$^-$  (I)

in which each of R$^1$ and R$^2$ may be an alkyl group.

The charge director may be added in order to impart and/or maintain sufficient electrostatic charge on the ink particles.

The sulfosuccinate salt of the general formula MAn may be an example of a micelle forming salt. The charge director may be substantially free or free of an acid of the general formula HA, where A is as described above. The charge director may include micelles of the sulfosuccinate salt enclosing at least some of the nanoparticles. The charge director may include at least some nanoparticles having a size of 200 nm or less, and/or in some examples 2 nm or more.

The charge director may further have a simple salt. Simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of SO$_4^{2-}$, PO$^{3-}$, NO$^{3-}$, HPO$_4^{2-}$, CO$_3^{2-}$, acetate, trifluoroacetate (TFA), Cl$^-$, BE$_4^-$, F—, ClO$_4$—, and TiO$_3^{4-}$, or from any sub-group thereof. The simple salt may be selected from CaCO$_3$, Ba$_2$TiO$_3$, Al$_2$(SO$_4$)$_3$, Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)3, LiClO$_4$ and LiBF$_4$, or any sub-group thereof. The charge director may further include basic barium petronate (BBP).

In the formula [R$^1$—O—C(O)CH$_2$CH(SO$_3^-$)C(O)—O—R$^2$], for example each of R$^1$ and R$^2$ may be independently an aliphatic alkyl group, such as a C$_{6-25}$ alkyl. The aliphatic alkyl group may be linear or branched. The aliphatic alkyl group may have a linear chain of more than 6 carbon atoms. R$^1$ and R$^2$ may be the same or different. In some examples, at least one of R$^1$ and R$^2$ is C$_{13}$H$_{27}$. In some examples, M is Na, K, Cs, Ca, or Ba.

The charge director may further include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and may be obtained, for example, from Chemtura. An example isopropyl amine sulphonate salt is dodecyl benzene sulfonic acid isopropyl amine, which is available from Croda.

In some examples, the charge director may constitute about 0.001% to 20%, for example, from about 0.01% to 20% by weight, as an additional example from about 0.01% to 10% by weight, and as a further example, from about 0.01% to 1% by weight of the solids of an electrophotographic ink composition. The charge director may constitute about 0.001% to 0.15% by weight of the solids of the electrophotographic ink composition, for example, 0.001% to 0.15%, as a further example 0.001% to 0.02% by weight of the solids of an electrophotographic ink composition, for example, 0.1% to 2% by weight of the solids of the electrophotographic ink composition, for example, 0.2% to 1.5% by weight of the solids of the electrophotographic ink composition in an example 0.1% to 1% by weight of the solids of the electrophotographic ink composition, for example, 0.2% to 0.8% by weight of the solids of the electrophotographic ink composition. The charge director may be present in an amount of at least 1 mg of charge director per gram of solids of the electrophotographic ink composition (which will be abbreviated to mg/g), for example, at least 2 mg/g, in a further example at least 3 mg/g, in another example at least 4 mg/g, for example, at least 5 mg/g. The moderate acid may be present in the amounts stated above, and the charge director may be present in an amount of from about 1 mg to about 50 mg of charge director per gram of solids of the electrostatic ink composition (which will be abbreviated to mg/g), for example, from 1 mg/g to 25 mg/g, as a further example, from 1 mg/g to 20 mg/g, for example, from about 1 mg/g to about 15 mg/g, as an additional example from about 1 mg/g to about 10 mg/g, for example, from about 3 mg/g to about 20 mg/g, as a further example from about 3 mg/g to about 15 mg/g, and for example, from about 5 mg/g to about 10 mg/g.

The electrophotographic ink composition may include a charge adjuvant. A charge adjuvant may promote charging of the particles when a charge director is present. The method as described here may involve adding a charge adjuvant at any stage. The charge adjuvant may include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant may be or may include aluminum di- or tristearate. The charge adjuvant may be present in an amount of about 0.1 to about 5% by weight, for example, about 0.1 to 1% by weight, in some examples about 0.3 to about 0.8% by weight of the solids of the electrophotographic ink composition, in some examples about 1 wt. % to about 3 wt. % of the solids of the electrophotographic ink composition, in some examples about 1.5 wt. % to about 2.5 wt. % of the solids of the electrophotographic ink composition.

In some examples, the electrophotographic ink composition may include, e.g., as a charge adjuvant, a salt of multivalent cation and a fatty acid anion. The salt of multivalent cation and a fatty acid anion may act as a charge adjuvant. The multivalent cation may, in some examples, be a divalent or a trivalent cation. In some examples, the multivalent cation may be selected from Group 2, transition metals and Group 3 and Group 4 in the Periodic Table. In some examples, the multivalent cation may include a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion may be selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt. % to about 5 wt. % of the solids of the electrophotographic ink composition, in some examples in an amount of 0.1 wt. % to about 2 wt. % of the solids of the electrophotographic ink composition, in some examples in an amount of 0.1 wt. % to about 2 wt. % of the solids of the electrostatic ink composition, in some examples in an amount of about 0.3 wt. % to about 1.5 wt. % of the solids of the electrophotographic ink composition, in some examples about 0.5 wt. % to about 1.2 wt. % of the solids of the electrophotographic ink composition, in some examples about 0.8 wt. % to about 1 wt. % of the solids of the electrophotographic ink composition, in some examples about 1 wt. % to about 3 wt. % of the solids of the electrophotographic ink composition, in some examples about 1.5 wt. % to about 2.5 wt. % of the solids of the electrophotographic ink composition.

The fragrant adsorbent particles, paste, and charge director may be ground to produce a liquid electrophotographic ink. The grinding step may be made with a grinder, e.g., an attritor, a disk mill, a sand mill, a ball mill, an impeller attrition mill, a vibro-energy mill, or the like; and ground for a period of time to form the ink composition. In another example, the grinding step is made with a ball mill. The grinding may occur at a rotation that ranges from about 200 rpm to about 1100 rpm, for example, from about 250 rpm to about 1000 rpm, and as a further example from about 300 rpm to about 900 rpm. The grinding may be carried out at a temperature ranging from about 25° C. to about 140° C., for example, from about 30° C. to about 120° C., and as a further example, from about 60° C. to about 85° C. The materials may be ground for a period of time ranging from 1 hour to 10 hours, for example, from about 2 hours to about 8 hours, for example, from about 3 hours to about 7 hours, and as a further example, about 4 hours.

The volatile fragrance may be used to create a volatile odor, i.e., the volatile fragrance should not stay in the electrophotographic ink printed on a substrate, but should instead release into the air. It may be appreciated that if the volatile fragrance releases too fast into the air, then the odor may be present for a short period of time, for example a day or so. The electrophotographic ink prepared by the described method may controllably release the volatile fragrance from the electrophotographic ink over a longer period of time, for example weeks or months.

The following examples illustrate examples of the disclosure that are presently best known. However, it is to be understood that the following are only examples or illustrative of the application of the principles of the present disclosure. Numerous modifications and alternative compositions, methods, and systems may be devised by those skilled in the art without departing from the spirit and scope of the present disclosure. The claims are intended to cover such modifications and arrangements. Thus, while the present disclosure has been described above with particularity, the following examples provide further details in connection with what are presently deemed to be the most practical and preferred examples of the disclosure.

EXAMPLES

Example 1

For every 1 gram of adsorbent (hydrophilic fumed silica having a specific surface area of 300 $m^2/g$, AEROSIL 300 available from Evonik), 10 grams of a volatile fragrance (Cherry 231115, available from DAN MOR Natural Products and Chemicals Ltd) and 5 grams of organic solvent (tetrahydrofuran, available from Bio-Lab, Ltd.) were added to a small bottle and allowed to soak for 24 hours. The particle solution was then transferred to a rotary evaporation apparatus, wherein the organic solvent was evaporated over 1 hour resulting in fragrant adsorbent particles (measuring the weight before and after evaporation to make sure no organic solvent was left in the system).

The fragrant adsorbent particles were transferred to a ceramic-lined tank of a 1-S ATTRITOR batch grinding mill available from Union Process Co. (Akron, Ohio) in an amount of 5% non-volatile solids of silica. 4.0 grams of paste with 2% VCA (aluminum stearate, available from Sigma-Aldrich) were also added to the grinder. The material was ground for 4 hours at 250 rpm at 40° C. resulting in an electrophotographic ink.

The paste was formed as follows: Resins Nucrel® 699 (available from DuPont), and AC-5120 (available from Honeywell) in a weight ratio of 4:1 were introduced with a carrier liquid, ISOPAR L (available from Exxon Corporation) into a laboratory scale Ross mixer. The mixture included 40% resins and 60% carrier liquid. The material was mixed at about 130° C. (266° F.) at a mixing speed of 50 Hz. After an hour and a half, the mixer speed was raised to 70 Hz and the mixture was then mixed at this speed for another hour. The heating was stopped and the mixer speed was reduced to 50 Hz. This allowed the paste to cool to room temperature. The paste was ground with ISOPAR L and VCA. The grinding speed was 250 rpm and the grinding was carried out for 12 hours at 30° C. Inorganic filler particles were included in the grinding unless otherwise indicated. The varnish composition was ready after grinding. The varnish composition was charged using a charge director prior to printing.

Example 2

The ink from Example 1 was used to print an image using a Rotovap, Laborota 4000-efficient—Heidolph. The image was formed as follows: Using CMYK printing, an image was printed in turn, or separately with four regular separations using an ink composition that did not have the fragrant adsorbent particles. The image was then printed with a final separation using the ink from Example 1 having the fragrant adsorbent particles.

The cherry note of the ink was maintained for three weeks after printing. Additionally, there were no traces of odor on the machine after printing compared to electrophotographic inks that were not subjected to rotary evaporation.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   soaking an adsorbent and a volatile fragrance in an organic solvent;
   evaporating the organic solvent to form fragrant adsorbent particles;
   grinding the fragrant adsorbent particles with a resin and a carrier liquid to form a paste; and
   diluting the paste to form an electrophotographic ink.

2. The method of claim 1, wherein a weight ratio of the adsorbent to the volatile fragrance ranges from 1:5 to 1:20 by weight.

3. The method of claim 1, wherein the soaking occurs for a period of time ranging from 15 hours to 48 hours.

4. The method of claim 1, wherein 100 wt. % of the organic solvent is evaporated from the fragrant adsorbed particles.

5. The method of claim 1, wherein after evaporation trace amounts of the organic solvent remain in the fragrant adsorbed particles.

6. The method of claim 1, wherein the evaporation of the organic solvent occurs in a period of time ranging from 20 minutes to 3 hours.

7. The method of claim 1, wherein the adsorbent is an adsorbent particle chosen from fumed aerosols, aerogels, silica gels, silica, precipitated silicon, vapor deposited silicon, clay, kaolin, perlite, bentonite, talc, mica, calcium carbonite, titanium dioxide, zinc oxide, iron oxide, silicon dioxide, or combinations thereof.

8. The method of claim 1, wherein the adsorbent is an absorbent having a pore size ranging from 0.5 nm to 80 nm.

9. The method of claim 1, wherein the adsorbent is an absorbent particle having a BET surface area ranging from 25 $m^2$/g to 1000 $m^2$/g.

10. The method of claim 1, wherein the adsorbent is an adsorbent particle having a BET surface area ranging from 50 $m^2$/g to 600 $m^2$/g.

11. The method of claim 1, wherein for every 1 gram of adsorbent, from 5 grams to 20 grams of volatile fragrance is present.

12. The method of claim 1, wherein the volatile fragrance is chosen from natural or synthetic fragrance materials.

13. The method of claim 1, wherein the carrier liquid has a low dielectric constant.

14. The method of claim 1, the electrophotographic ink comprising a pigment.

* * * * *